(12) United States Patent
Tokoyoda et al.

(10) Patent No.: US 9,612,891 B2
(45) Date of Patent: Apr. 4, 2017

(54) MEMORY CONTROLLER, INFORMATION PROCESSING APPARATUS, AND METHOD OF CONTROLLING INFORMATION PROCESSING APPARATUS

(71) Applicant: FUJITSU LIMITED, Kawasaki-shi, Kanagawa (JP)

(72) Inventors: Akio Tokoyoda, Fuchu (JP); Yuta Toyoda, Kawasaki (JP); Makoto Suga, Edogawa (JP); Masatoshi Aihara, Hiratsuka (JP); Koji Hosoe, Yamato (JP)

(73) Assignee: FUJITSU LIMITED, Kawasaki (JP)

( * ) Notice: Subject to any disclaimer, the term of this patent is extended or adjusted under 35 U.S.C. 154(b) by 225 days.

(21) Appl. No.: 14/447,671

(22) Filed: Jul. 31, 2014

(65) Prior Publication Data

US 2015/0089281 A1    Mar. 26, 2015

(30) Foreign Application Priority Data

Sep. 25, 2013  (JP) .................................. 2013-198656

(51) Int. Cl.
G06F 11/00  (2006.01)
G06F 11/07  (2006.01)
G06F 13/00  (2006.01)
G06F 11/10  (2006.01)

(52) U.S. Cl.
CPC ........ *G06F 11/073* (2013.01); *G06F 11/0763* (2013.01); *G06F 11/0772* (2013.01); *G06F 11/1048* (2013.01); *G06F 13/00* (2013.01)

(58) Field of Classification Search
CPC ..................................................... G06F 11/073
See application file for complete search history.

(56) References Cited

U.S. PATENT DOCUMENTS

| | | | | |
|---|---|---|---|---|
| 4,951,193 A | * | 8/1990 | Muramatsu | G06F 8/451 711/206 |
| 6,009,542 A | * | 12/1999 | Koller | G06F 3/0619 714/42 |
| 7,472,250 B2 | * | 12/2008 | Mori | G06F 3/0608 710/66 |
| 8,707,110 B1 | * | 4/2014 | Shaeffer | G06F 11/1004 714/52 |
| 8,949,694 B2 | * | 2/2015 | Nicholas | G06F 11/1016 714/768 |
| 2008/0034267 A1 | * | 2/2008 | Hou | H04L 1/0045 714/752 |
| 2008/0235485 A1 | | 9/2008 | Haertel | |

(Continued)

FOREIGN PATENT DOCUMENTS

JP         55-25812         2/1980
JP         2010-522374      7/2010

*Primary Examiner* — Christopher McCarthy
(74) *Attorney, Agent, or Firm* — Fujitsu Patent Center

(57) ABSTRACT

A memory controller is provided between a CPU and a main memory, controls access from the CPU to the main memory, and includes a data storage area and a controller. In a case where error information indicating that an error occurs is included in write data from the CPU to the main memory, the controller stores the write data in a data storage area in association with a writing destination address. Therefore, even in a case where the error information is not written in the main memory, the error information can be recorded.

18 Claims, 6 Drawing Sheets

(56) References Cited

U.S. PATENT DOCUMENTS

| | | | |
|---|---|---|---|
| 2010/0177575 A1* | 7/2010 | Craske | G11C 7/1093 365/189.16 |
| 2011/0035560 A1* | 2/2011 | Bodrozic | G01R 31/31716 711/155 |
| 2011/0231594 A1* | 9/2011 | Sugimoto | G06F 3/0616 711/103 |
| 2014/0201597 A1* | 7/2014 | Hoekstra | G06F 11/1048 714/764 |
| 2015/0199233 A1* | 7/2015 | Pelley | G06F 11/1076 714/764 |
| 2017/0004035 A1* | 1/2017 | Suh | |

* cited by examiner

FIG. 2

31: ERROR INFORMATION STORAGE AREA (DATA STORAGE AREA)

| ADDRESS  | DATA | ECC | VALID BIT |
|----------|------|-----|-----------|
| ADDRESS0 |      |     |           |
| ADDRESS1 |      |     |           |
| ADDRESS2 |      |     |           |
| ADDRESS3 |      |     |           |

31a — ADDRESS, 31b — DATA, 31c — ECC, 31d — VALID BIT

FIG. 4

| BIT | VALUE |
|---|---|
| Data 63 | INDEFINITE |
| Data [62:36] | 0 |
| Data 35 | INDEFINITE |
| Data [34:23] | 0 |
| Data 22 | INDEFINITE |
| Data [21:16] | 0 |
| Data [15:0] | ERROR ID (ERROR OCCURRENCE CAUSE INFORMATION) |
| ECC [7:0] | VALUE HAVING SYNDROME OF 7f, BECAUSE OF HAVING ERRORS IN THREE PIECES OF Data 63, 35, 22 |

MEMORY CONTROLLER, INFORMATION PROCESSING APPARATUS, AND METHOD OF CONTROLLING INFORMATION PROCESSING APPARATUS

CROSS-REFERENCE TO RELATED APPLICATION

This application is based upon and claims the benefit of priority of the prior Japanese Application No. 2013-198656 filed on Sep. 25, 2013 in Japan, the entire contents of which are hereby incorporated by reference.

FIELD

The present invention relates to a memory controller, an information processing apparatus, and a method of controlling the information processing apparatus.

BACKGROUND

For example, data handled in a system which includes a processor such as a central processing unit (CPU) and a main memory such as a dual inline memory module (DIMM) is generally protected using a code such as an error correcting code (ECC). In a case where an error of 1 bit occurs in the data, the error can be corrected using the code. However, it is difficult to correct an error of 2 bits or more using the code, and the error of 2 bits or more left as an uncorrectable error (hereinafter, referred to as a UE).

The memory such as the DIMM is provided with an ECC area for storing an ECC besides a data area for storing data, and a memory controller can directly write information such as the ECC in the ECC area. Then, in a case where the UE occurs in write data from the processor to the memory, the processor writes a special code in the ECC area through the memory controller, so that the error which has occurred in the write data can be definitely separated from other errors as a Marked-UE.

For example, a special syndrome (0x7f) indicating a 3-bit error is written in the ECC area as a special code indicating the Marked-UE, and separated from a normal ECC. Further, in the data area corresponding to the ECC area, information (error ID (IDentification), error occurrence cause information) which can be used to specify an occurrence place of the Marked-UE is also stored.

Accordingly, when data is read from the memory, if it is found out that the special code is written in the ECC area corresponding to the read data, the processor can identify that the data is data having the UE. Therefore, in a case where data unnecessary for the process of the processor has the UE, the system can be operated as it is. On the other hand, in a case where the data having the UE is read, since the data is identified as the data having the UE, the processor can cope with the UE in some way.

In addition, in a case where the data area having the Marked-UE is overwritten by data having no Marked-UE in the memory, the data area comes into a state having no Marked-UE, so that the system keeps on the operation.

In recent years, as a memory, a hybrid memory cube (HMC) is proposed in that a dynamic random access memory (DRAM) chip having a three dimensional structure is connected using through-silicon vias (TSVs) for the purpose of an increase in process speed. As described above, the processor (memory controller) can directly write any information such as the Marked-UE other than the ECC in the ECC area of the memory such as the DIMM. On the contrary, the ECC is automatically written in the ECC area of the memory such as the HMC, so that the processor (memory controller) is not allowed to directly write any information such as the Marked-UE other than the ECC.

As described above, in a case where information on an error (for example, the UE) occurred on the upstream side (the processor side) at the time of writing data in the memory is not be stored, the processor is not allowed to identify whether the UE occurs in the data in the memory. Therefore, when an error occurs, it is considered that the entire page having the error is cut off from the system by an operating system (OS).

However, in a case where the entire page is cut off from the system, there is a problem in that when the error occurs during a high criticality process, the termination of the high criticality process is inevitable until the cutting-off process is ended.

Further, since the area having the error is cut off only in units of pages, a necessarily cutting-off range will be widened when a large page is employed. Therefore, there is a problem in that a range of an area having no error to be cut off together with the area having the error is widened, and the use efficiency of the data area of the memory is dropped.

SUMMARY

A memory controller according to an embodiment of the invention is provided between a processor and a main memory and controls access from the processor to the main memory. The memory controller includes a data storage area and a controller configured to store, when error information indicating that an error occurs is included in first write data from the processor to the main memory, the first write data in the data storage area in association with a writing destination address of the first write data.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 2 is a diagram illustrating contents of a data storage area in the memory controller illustrated in FIG. 1;

FIG. 4 is a diagram illustrating an exemplary configuration of write data in which a Marked-UE in the embodiment occurs;

DESCRIPTION OF THE PREFERRED EMBODIMENTS

Hereinafter, embodiments will be described with reference to the drawings.

Figure 1:
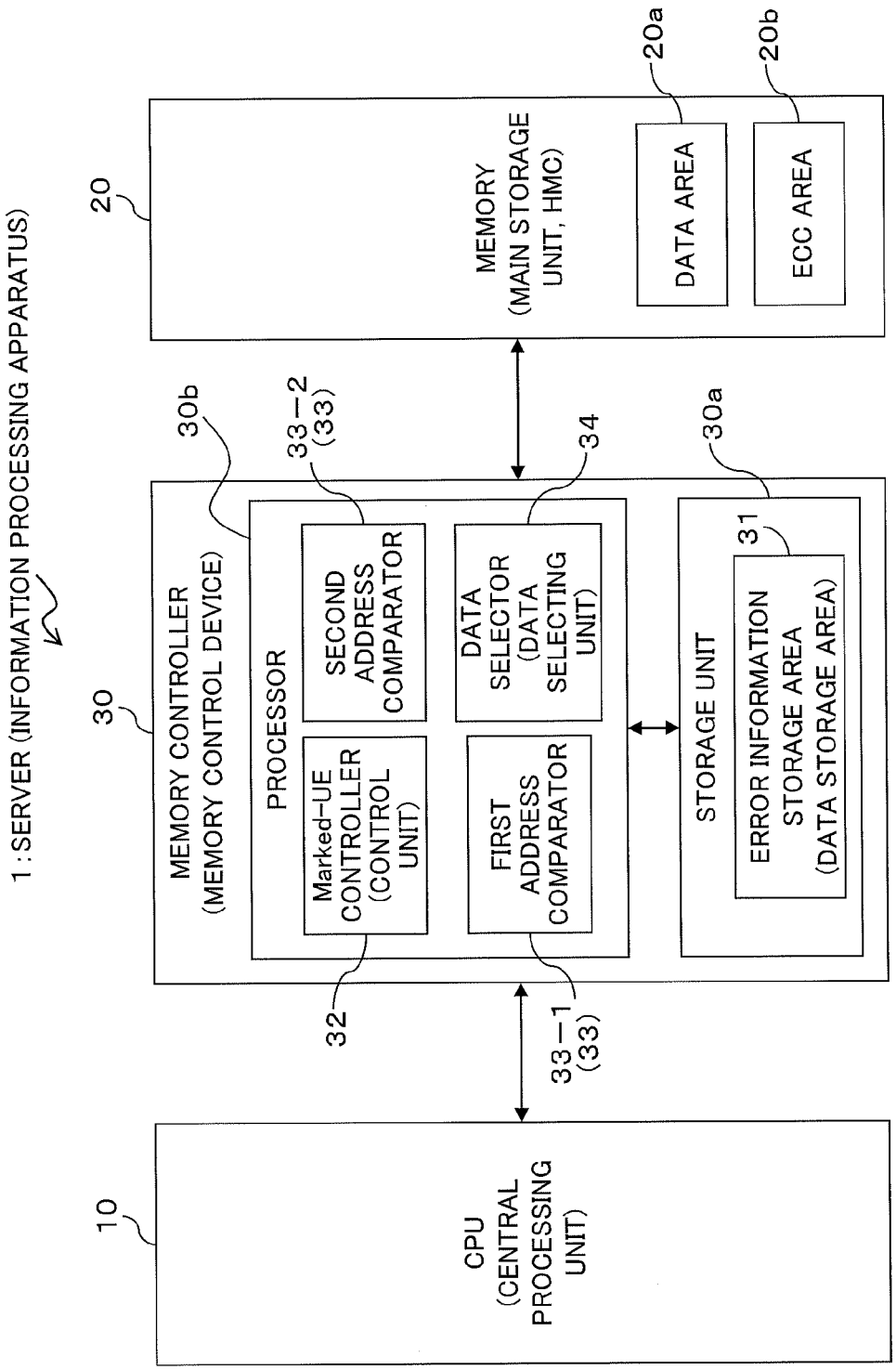
FIG. 1 is a block diagram illustrating a hardware configuration and a functional configuration of an information processing apparatus which includes a memory controller according to the embodiment.

[1] Configuration of Information Processing Apparatus Including Memory Controller of Embodiment First, a hardware configuration and a functional configuration of an information processing apparatus 1 which includes a memory controller 30 according to the embodiment will be described with reference to FIGS. 1 to 4. In addition, FIG. 1 is a block diagram illustrating the hardware configuration and the functional configuration of the information processing apparatus 1 which includes the memory controller 30 according to the embodiment, and FIG. 2 is a diagram illustrating contents of a data storage area 31 in the memory controller 30 illustrated in FIG. 1. Further, FIG. 3 is a block diagram illustrating detailed configurations of the memory controller 30 illustrated in FIG. 1, and FIG. 4 is a diagram illustrating an exemplary configuration of write data in which a Marked-UE in the embodiment occurs.

As illustrated in FIG. 1, the information processing apparatus 1, for example, is a server which includes a central processing unit (CPU; processor) 10, a memory (main memory) 20, and the memory controller 30.

In the embodiment, the memory 20, for example, is a memory such as the hybrid memory cube (HMC) described above which includes a data area 20*a* and an ECC area 20*b*. In such an ECC area 20*b* of the memory 20, an ECC is automatically written. Therefore, the CPU 10 is not allowed to directly write any information such as the Marked-UE other than the ECC through the memory controller 30, for example, the ECC embedded with error information which will be described below with reference to FIG. 4.

Figure 3:
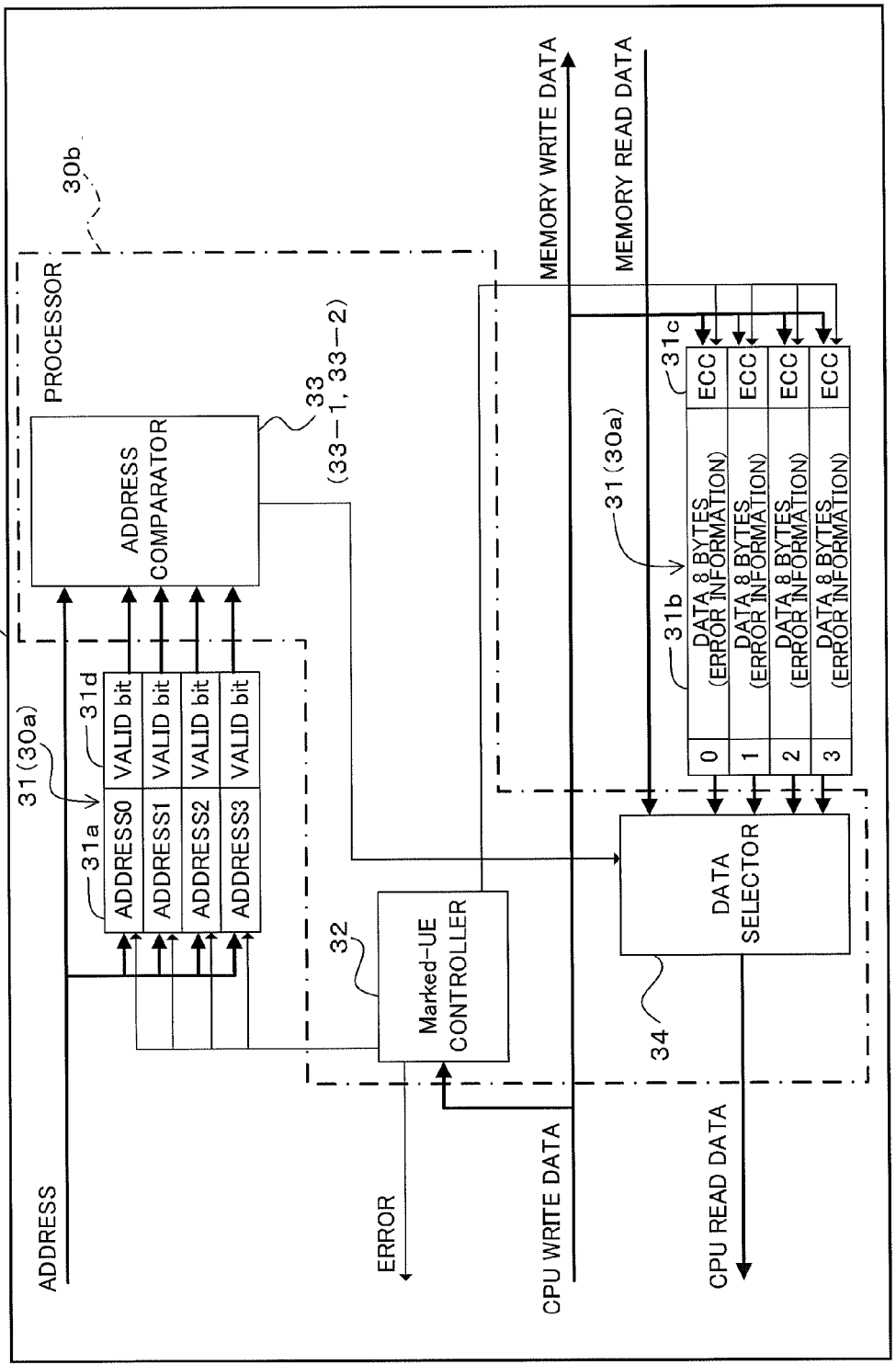
FIG. 3 is a block diagram illustrating detailed configurations of the memory controller illustrated in FIG. 1.

As illustrated in FIGS. 1 and 3, the memory controller 30 is provided between the CPU 10 and the memory 20, and includes a storage unit 30*a* and a processor 30*b* to control access from the CPU 10 to the memory 20.

The storage unit 30*a*, for example, is configured to include a random access memory (RAM), a flip-flop (FF), a register, and the like, and in the embodiment an error information storage area (data storage area) 31 is provided. As illustrated in FIGS. 2 and 3, the error information storage area 31, for example, includes four areas (records). Each area (each record) includes an address area 31*a*, a data area 31*b*, an ECC area 31*c*, and a valid bit area 31*d*.

In each area (each record) of the error information storage area 31, write data (first write data) from the CPU 10 to the memory 20 including error information which indicates that the Marked-UE (error) occurs is stored in association with writing destination addresses (addresses 0 to 3).

Herein, the write data which includes the error information (the write data having the Marked-UE), for example, includes a 64-bit Word portion (data portion) Data [63:0] and an 8-bit ECC [7:0] for the Word portion as illustrated in FIG. 4. In Data [15:0] of the Word portion, error occurrence cause information (error ID) is set as the error information. 3-bit data of Data 63, 35, and 22 in the Word portion is in an inverted or indefinite state. In correspondence with the 3-bit data, ECC [7:0] includes a value which has a syndrome of 7f because of errors in three pieces of Data 63, 35, and 22. In other words, a special syndrome (0x7f) indicating a 3-bit error is embedded in ECC [7:0] as a special code indicating the Marked-UE.

Then, the address area 31*a* in the error information storage area 31 is stored with the writing destination addresses (addresses 0 to 3). The data area 31*b* is stored with the Word portion Data [63:0] (see FIG. 4) of the write data which includes the error occurrence cause information (error ID) as the error information. The error occurrence cause information (error ID) is information with which an occurrence place of the Marked-UE can be specified.

Further, the ECC area 31*c* is stored with ECC [7:0] (see FIG. 4). Furthermore, the valid bit area 31*d* is stored with a value (1-bit information) which indicates the information (first write data) stored in each of four areas (records) of the error information storage area 31 is valid or invalid. For example, the valid bit area 31*d* is set with "1" in a case where the information is valid or "0" in a case where the information is invalid.

The processor 30*b*, for example, executes a predetermined program to function as a Marked-UE controller 32, address comparators 33 (a first address comparator 33-1 and a second address comparator 33-2), and a data selector 34 as illustrated in FIGS. 1 and 3. The above predetermined program may be stored in the storage unit 30*a*, or may be read out of a storage area in the outside of the memory controller 30.

In a case where the error information indicating that the Marked-UE occurs is included in write data (first write data) from the CPU 10 to the memory 20, the Marked-UE controller (controller) 32 does not write the write data in the memory 20 but stores the write data in the error information storage area 31 (areas 31*a* to 31*c*) in association with the writing destination address of the write data.

At this time, the Marked-UE controller 32 determines whether there is an area (area set with "0" in the area 31*d*) indicating that the valid bit area 31*d* among a plurality of areas is invalid, thereby determining whether there is an empty space in the error information storage area 31. In a case where there is the error information storage area 31 in which the area 31*d* is set with "0", that is, in a case where there is an empty space in the error information storage area 31, the Marked-UE controller 32 stores the write data in association with the writing destination address and sets the valid bit area 31*d* with "1" indicating "valid".

On the other hand, in a case where there is no error information storage area 31 in which the area 31*d* is set with "0", that is, in a case where there is no empty space in the error information storage area 31, the Marked-UE controller 32 is not allowed to write the write data in the error information storage area 31, and thus informs the CPU 10 of an error.

In a case where the above-mentioned error information is not included in second write data (write data) from the CPU 10 to the memory 20, that is, in a case where the second write data is normal data having no Marked-UE, the first address comparator 33-1 performs the following comparison. In other words, the first address comparator 33-1 compares the writing destination address of the second write data and the writing destination address stored in the address area 31*a* of the error information storage area 31 in which the valid bit area 31*d* is set with "1" indicating "valid".

As a result of the comparison by the first address comparator 33-1, in a case where the writing destination address of the second write data and the writing destination address of the first write data in the error information storage area 31 are matched, the Marked-UE controller 32 performs the following process. In other words, the Marked-UE controller 32 sets "0" indicating "invalid" in the valid bit area 31*d* corresponding to the area for storing the first write data. Then, the Marked-UE controller 32 writes normal write data (second write data) having no Marked-UE at the writing destination address (the same as the writing destination address of the first write data) of the second write data in the memory 20.

On the other hand, as a result of the comparison by the first address comparator 33-1, in a case where the writing destination address of the second write data and the writing destination address of the first write data in the error information storage area 31 are not matched, the Marked-UE controller 32 writes the second write data, as it is, at the writing destination address of the second write data in the memory 20.

In a case where a read request (read command) from the CPU 10 to the memory 20 is received, the second address comparator 33-2 performs the following comparison. In other words, the second address comparator 33-2 compares a read address of the read request and the writing destination address in the address area 31a of the error information storage area 31 in which the valid bit area 31d is set with "1" indicating "valid".

As a result of the comparison by the second address comparator 33-2, in a case where the read address and the writing destination address of the first write data in the error information storage area 31 are matched, that is, in a case where read target data of the read request is stored in the error information storage area 31, the data selector 34 performs the following process. In other words, the data selector 34 selects and reads the first write data including the error information from the areas 31b and 31c of the error information storage area 31 corresponding to the writing destination address of the first write data, and sends the first write data back to the CPU 10 as the read data according to the read request. In general, the access of the CPU 10 is performed in units of caches (128 bytes, 256 bytes, and the like). However, when the read data is sent to the CPU 10, the data selector 34 replaces the read data with data (8 bytes; the data stored in the areas 31b and 31c) of the Word portion including Marked-UE information.

As a result of the comparison by the second address comparator 33-2, in a case where the read address and the writing destination address of the first write data in the error information storage area 31 are not matched, that is, in a case where the read target data of the read request is not stored in the error information storage area 31 but in the memory 20, the data selector 34 performs the following process. In other words, the data selector 34 selects and reads data from the read address of the memory 20, and sends the data back to the CPU 10 as the read data according to the read request.

In addition, in the embodiment, the above-mentioned functions as the first address comparator 33-1 and the second address comparator 33-2 may be realized by one address comparator 33 as illustrated in FIG. 3.

Figure 5:
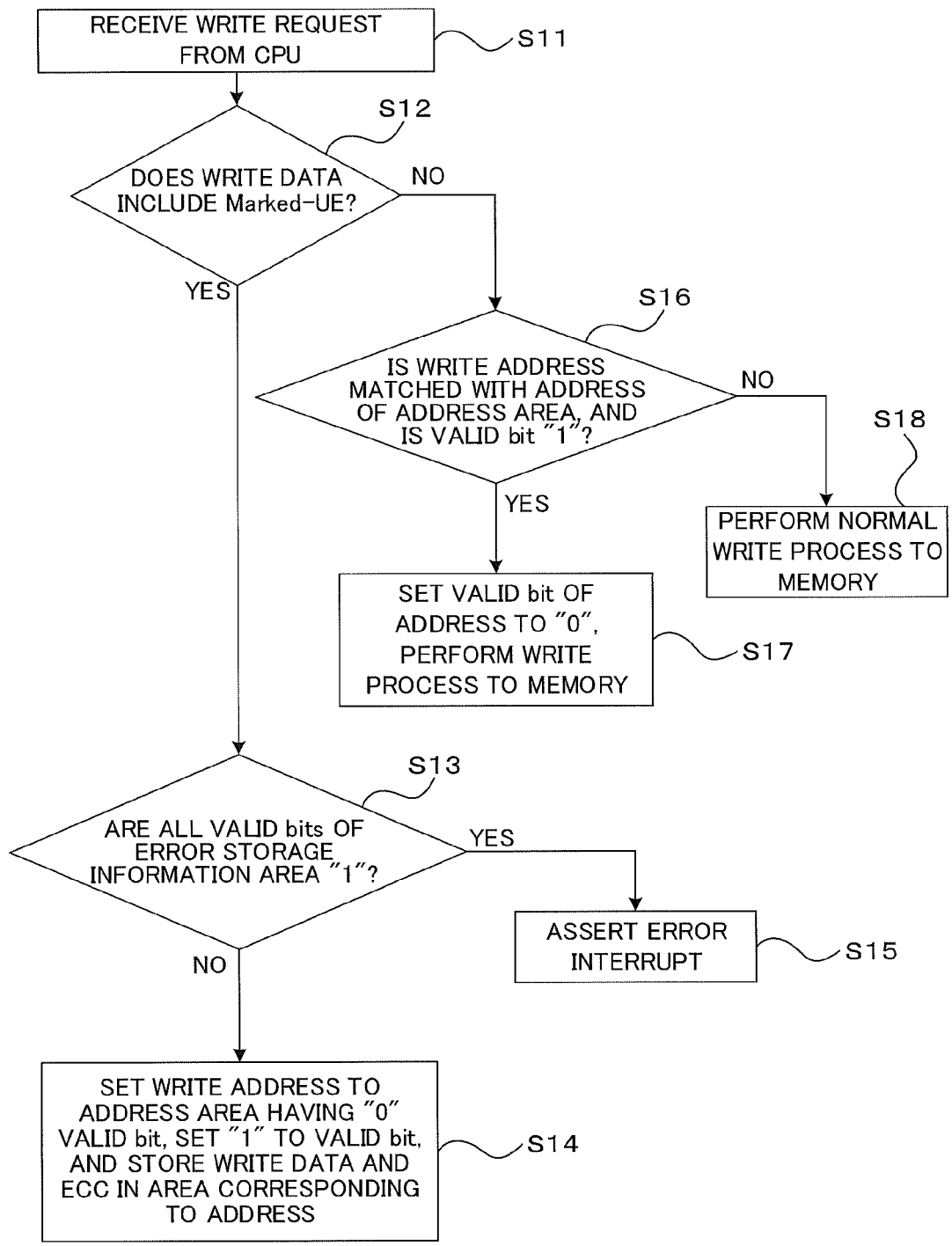
FIG. 5 is a flowchart for describing an operation of the memory controller illustrated in FIGS. 1 and 3 when a write request is received.
Figure 6:
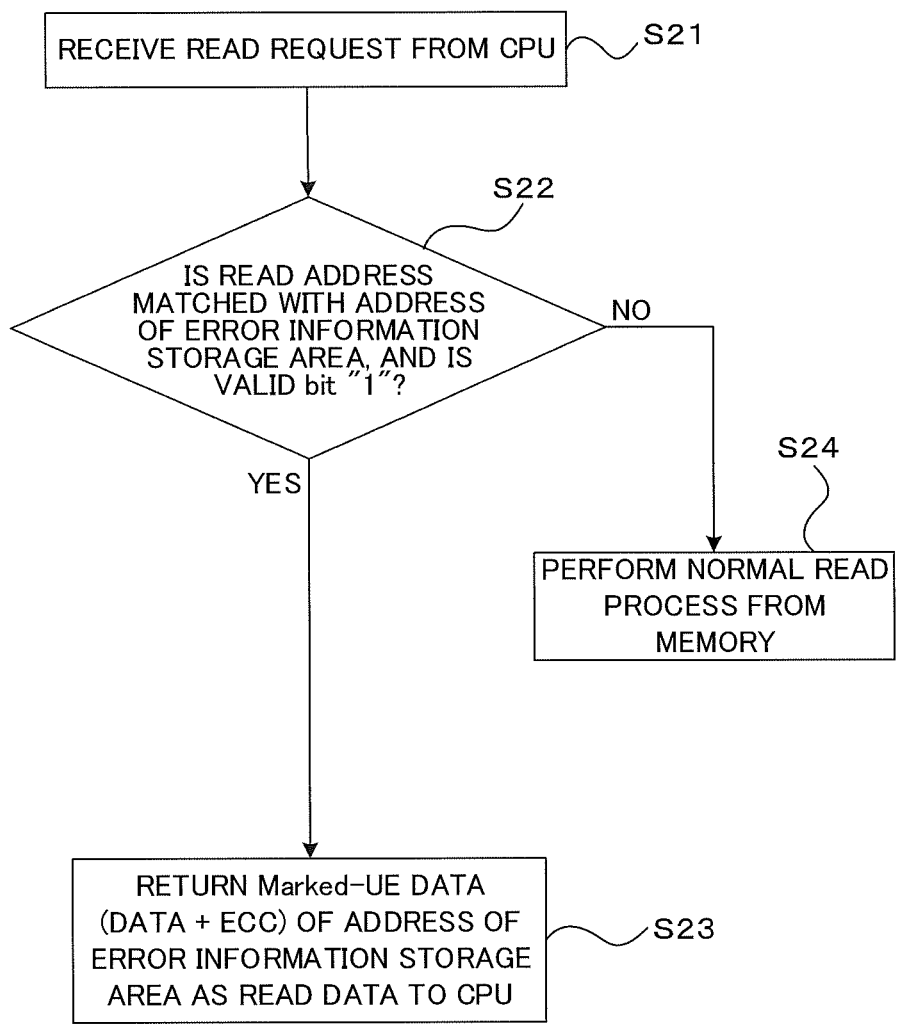
FIG. 6 is a flowchart for describing an operation of the memory controller illustrated in FIGS. 1 and 3 when a read request is received.

[2] Operations of Information Processing Apparatus Including Memory Controller of Embodiment Next, the operations of a server 1 which includes the memory controller 30 configured as described above according to the embodiment will be described with reference to FIGS. 5 and 6.

[2-1] Operations in Receiving Write Request

First, the operations of the memory controller 30 illustrated in FIGS. 1 and 3 in receiving a write request will be described according to a flowchart (Steps S11 to S18) illustrated in FIG. 5.

When receiving a write request (write command) carrying the write data from the CPU 10 (Step S11), the Marked-UE controller 32 determines whether the write data includes the Marked-UE information (Step S12). In addition, the write data (first write data) including the Marked-UE information is configured as illustrated in FIG. 4.

In a case where the write data includes the Marked-UE information (YES route in Step S12; a case where the write data is the first write data), the Marked-UE controller 32 determines whether there is an empty space in the error information storage area 31. In other words, it is determined whether all the valid bit areas 31d in the error information storage area 31 are set with "1" (Step S13).

In a case where all the valid bit areas 31d are not set with "1" (NO route in Step S13), that is, in a case where there is an empty space in the error information storage area 31 because of having a valid bit area 31d set with "0", the Marked-UE controller 32 performs the process of Step S14. In other words, the writing destination address (write address) is set in the address area 31a corresponding to the valid bit area 31d set with "0" indicating "invalid", and the valid bit area 31d is set with "1" indicating "valid". Then, the write data and the ECC are not written in the memory 20, but stored in the areas 31b and 31c corresponding to the valid bit area 31d in association with the writing destination address (Step S14).

In a case where all the valid bit areas 31d are set with "1" (YES route in Step S13), that is, in a case where there is no empty space in the error information storage area 31 because of having no valid bit area 31d set with "0", the Marked-UE controller 32 performs the process of Step S15. In other words, since the write data is not allowed to be written in the error information storage area 31, an error interrupt is asserted, and the CPU 10 is informed of the error (Step S15).

In a case where the write data does not include the Marked-UE information (NO route in Step S12; a case where the write data is normal data (the second write data) having no Marked-UE), the first address comparator 33-1 performs the process of Step S16. In other words, the writing destination address of the second write data is compared with the writing destination address stored in the address area 31a of the error information storage area 31 in which the valid bit area 31d is set with "1" indicating "valid" (Step S16).

As a result of the comparison by the first address comparator 33-1, in a case where the same address as the writing destination address of the second write data is stored in the valid area of the error information storage area 31 (YES route in Step S16), the Marked-UE controller 32 performs the process of Step S17. In other words, the valid bit area 31d for the area in which the same address as the writing destination address of the second write data is set with "0" indicating "invalid". Therefore, the write data (first write data) having the Marked-UE which is stored in the error information storage area 31 is substantially erased. Then, the normal write data (second write data) having no Marked-UE is written at the writing destination address (the same as the writing destination address of the first write data) of the second write data in the memory 20 by the write process to the memory 20 (Step S17).

In this way, in a case where there is a write request for the normal write data having no Marked-UE on an address at which the error information (Marked-UE information) is stored in the error information storage area 31, the corresponding valid bit area 31d is set with "0" indicating "invalid", and the normal write data is written at the corresponding address of the memory 20.

On the other hand, as a result of the comparison by the first address comparator 33-1, in a case where the same address as the writing destination address of the second write data is not stored in a valid area of the error information storage area 31 (NO route in Step S16), the Marked-UE controller 32 performs the process of Step S18 (a normal write process to the memory 20). In other words, the second write data is not stored in the error information storage area 31, but stored, as it is, at the writing destination address of the second write data in the memory 20 (Step S18).

[2-2] Operations in Receiving Read Request

Next, the operations of the memory controller 30 illustrated in FIGS. 1 and 3 in receiving a read request will be described according to a flowchart (Steps S21 to S24) illustrated in FIG. 6.

When the memory controller 30 receives a read request (read command) from the CPU 10 to the memory 20 (Step S21), the second address comparator 33-2 performs the process of Step S22. In other words, a read address of the read request is compared with the writing destination address in the address area 31a of the error information storage area 31 in which the valid bit area 31d is set with "1" indicating "valid" (Step S22).

As a result of the comparison by the second address comparator 33-2, in a case where the same address as the read address of the read request is stored in a valid area of the error information storage area 31 (YES route in Step S22), the data selector 34 performs the process of Step S23. In other words, the first write data (DATA+ECC) including the error information is read from the areas 31b and 31c of the error information storage area 31 corresponding to the same address as the read address, and is sent back to the CPU 10 as the read data according to the read request (Step S23). Therefore, the read data to the CPU 10 is replaced with not the data from the memory 20, but the data (the data stored in the areas 31b and 31c) in the Word portion which includes the Marked-UE information from the error information storage area 31.

On the other hand, as a result of the comparison by the second address comparator 33-2, in a case where the same address as the read address of the read request is not stored in a valid area of the error information storage area 31 (NO route in Step S22), the data selector 34 performs the process of Step S24. In other words, a normal read process from the memory is performed, data is read from the read address of the memory 20, and the data is sent back to the CPU 10 as the read data according to the read request (Step S24).

[3] Advantages of Information Processing Apparatus Including Memory Controller of Embodiment With the memory controller 30 and the server 1 according to the embodiment, even in the case of employing a memory (for example, the HMC) to which a processor memory system is not allowed to directly write the error information (Marked-UE) in the ECC area 20b of the memory 20, it is possible to write the error information in the error information storage area 31 of the memory controller 30.

Therefore, the data having the Marked-UE is read from the error information storage area 31 of the memory controller 30. Then, in a case where a special code is written in the ECC area corresponding to the read data, the CPU 10 can determine that the data is the one having a UE. Accordingly, in a case where data unnecessary for the process of the CPU 10 has the UE, the system can be operated as it is. On the other hand, in a case where the data having the UE is read, the data is identified as the data having the UE, and thus the CPU 10 can cope with the UE in some way.

Further, since the Marked-UE does not occur frequently, a small volume of storage area to be secured may be sufficient as the error information storage area 31 of the memory controller 30. Furthermore, data to be stored for one error is information obtained by combining address information, error occurrence cause information (for example, 8 bytes), an ECC, and a valid bit, and thus a small volume of storage area is sufficient. Therefore, the function of the embodiment can be realized by configuring the function with a small scale of circuits.

On the other hand, as described above, the entire page having an error is cut off from the system by the OS when an error occurs. At this time, when an error occurs during a high criticality process, the high criticality process has been terminated until the end of the separating process. Further, since an erroneous area is cut off only in units of pages, a necessarily cutting-off range has been widened when a large page is employed.

On the contrary, in the case of employing the memory controller 30 according to the embodiment, even when an error occurs during a high criticality process, a minimum process (storing to the error information storage area 31) is performed when the error occurs, and then the left process can be performed. Therefore, it is possible to cope with the error such as the UE without terminating the entire high criticality process.

Further, in the case of employing the memory controller 30 according to the embodiment, there is no need to cut off the entire page, and thus, it is possible to cope with the error such that only a unit (data block) of process including an erroneous area is blocked not to be used. Therefore, it is possible to cope with the error such as the UE without dropping the use efficiency of data areas in the memory.

[4] Others

Hitherto, the description has been made about preferred embodiments of the invention, but the invention is not limited to the related specific embodiments. The invention can be variously modified and changed within a scope not departing from the spirit of the invention.

In the embodiments described above, the description has been made about a case where the number of areas (records) in the error information storage area (data storage area) 31 is 4, but the invention is not limited thereto.

Further, some or all of the functions of the memory controller 30 including the functions as the Marked-UE controller (controller) 32, the address comparators 33 (the first address comparator 33-1 and the second address comparator 33-2), the data selector (data selector) 34 described above may be realized by a predetermined program executed by a computer (including a micro-processing unit (MPU), a CPU, and various terminals).

The program, for example, may be provided in types of being recorded in a computer-readable recording medium such as a flexible disk, a CD (a CD-ROM, a CD-R, a CD-RW, and the like), a DVD (a DVD-ROM, a DVD-RAM, a DVD-R, a DVD-RW, a DVD+R, a DVD+RW, and the like), and a Blu-ray disk. In this case, the computer reads the program from the recording medium, and transfers and stores the program into an inner storage unit or an external storage unit for use.

According to an embodiment, even in a case where the error information is not written in the storage unit, the error information can be recorded.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has (have) been described in detail, it should be understood that the various changes, substitutions, and alterations could be made hereto without departing from the spirit and scope of the invention.

What is claimed is:

1. A memory controller comprising:
   a data storage area; and
   a first processor provided between a second processor and a main memory to control access from the second processor to the main memory and the first processor configured to store, when error information indicating that an error occurs is included in first write data from the second processor to the main memory, the first write data in the data storage area in association with a writing destination address of the first write data,
   the first write data stored in the data storage area includes a data portion which contains error occurrence cause information as the error information, and an error correcting code (ECC), in which a code indicating that the error occurs is embedded as the error information, for the data portion.

2. The memory controller according to claim 1, wherein
   the data storage area includes a plurality of areas, each of which stores each of a plurality of pieces of the first write data,
   the area is provided with a bit which indicates whether the first write data stored in the area is valid or invalid, and
   the first processor is configured to store the first write data in an area of which the bit indicates "invalid" among the plurality of areas in association with the writing destination address.

3. The memory controller according to claim 2, wherein the first processor is configured to inform, when there is no area in which the first write data is written and of which the bit indicates "invalid", the second processor of an error.

4. The memory controller according to claim 2, wherein the first processor is configured to:
   perform, when the error information is not included in second write data from the second processor to the main memory, first comparing a writing destination address of the second write data and the writing destination address of the first write data in an area of which the bit indicates "valid" among the plurality of areas; and
   invalidate, when the writing destination address of the second write data and the writing destination address of the first write data are matched as a result of the first comparing by the first processor, the bit of the area in which the first write data is stored, and write the second write data at the writing destination address of the second write data in the main memory.

5. The memory controller according to claim 4, wherein the first processor is configured to write, when the writing destination address of the second write data and the writing destination address of the first write data are not matched as a result of the first comparing by the first processor, the second write data at the writing destination address of the second write data in the main memory.

6. The memory controller according to claim 2, wherein the first processor is configured to:
   perform, when a read request from the processor to the main memory is received, second comparing a read address of the read request and the writing destination address of the first write data in an area of which the bit indicates "valid" among the plurality of areas; and
   select and read, when the read address and the writing destination address of the first write data are matched as a result of the second comparing by the first processor, the first write data from an area corresponding to the writing destination address of the first write data in the data storage area and to send the first write data as read data back to the second processor in response to the read request.

7. The memory controller according to claim 6, wherein the first processor is configured to select and read, when the read address and the writing destination address of the first write data are not matched as a result of the second comparing by the first processor, data from the read address of the main memory, and send the data as read data back to the second processor in response to the read request.

8. The memory controller according to claim 1, wherein the main memory is not allowed to write the ECC embedded with the error information in an error correcting code (ECC) area for the first write data.

9. The memory controller according to claim 8, wherein the main memory is a hybrid memory cube (HMC).

10. An information processing apparatus comprising:
    a second processor;
    a main memory; and
    a memory controller configured to be provided between the second processor and the main memory and to control access from the second processor to the main memory, wherein
    the memory controller includes
    a data storage area, and
    a first processor configured to store, when error information indicating that an error occurs is included in first write data from the second processor to the main memory, the first write data in the data storage area in association with a writing destination address of the first write data,
    the first write data stored in the data storage area includes a data portion which contains error occurrence cause information as the error information, and an error correcting code (ECC), in which a code indicating that the error occurs is embedded as the error information, for the data portion.

11. The information processing apparatus according to claim 10, wherein
    the data storage area includes a plurality of areas, each of which stores each of a plurality of pieces of the first write data,
    the area is provided with a bit which indicates whether the first write data stored in the area is valid or invalid, and
    the first processor is configured to store the first write data in an area of which the bit indicates "invalid" among the plurality of areas in association with the writing destination address.

12. The information processing apparatus according to claim 11, wherein the first processor is configured to inform, when there is no area in which the first write data is written and of which the bit indicates "invalid", the second processor of an error.

13. The information processing apparatus according to claim 11, wherein
    the first processor is configured to:
    perform, when the error information is not included in second write data from the second processor to the main memory, first comparing a writing destination address of the second write data and the writing destination address of the first write data in an area of which the bit indicates "valid" among the plurality of areas; and
    invalidate, when the writing destination address of the second write data and the writing destination address of the first write data are matched as a result of the first comparing by the first processor, the bit of the area in which the first write data is stored, and write the second write data at the writing destination address of the second write data in the main memory.

14. The information processing apparatus according to claim 13, wherein the first processor is configured to write, when the writing destination address of the second write data and the writing destination address of the first write data are not matched as a result of the first comparing by the first processor, the second write data at the writing destination address of the second write data in the main memory.

15. The information processing apparatus according to claim 11, wherein the first processor is configured to:
  perform, when a read request from the processor to the main memory is received, second comparing a read address of the read request and the writing destination address of the first write data in an area of which the bit indicates "valid" among the plurality of areas; and
  select and read, when the read address and the writing destination address of the first write data are matched as a result of the second comparing by the first processor, the first write data from an area corresponding to the writing destination address of the first write data in the data storage area and to send the first write data as read data back to the second processor in response to the read request.

16. The information processing apparatus according to claim 15, wherein the first processor is configured to select and read, when the read address and the writing destination address of the first write data are not matched as a result of the second comparing by the first processor, data from the read address of the main memory, and send the data as read data back to the second processor in response to the read request.

17. The information processing apparatus according to claim 10, wherein the main memory is a memory which is not allowed to write the ECC embedded with the error information in an error correcting code (ECC) area for the first write data.

18. A method of controlling an information processing apparatus which includes a memory controller between a processor and a main memory and controls access from the processor to the main memory, the method comprising:
  receiving write data from the processor to the main memory; and
  storing, when error information indicating that an error occurs is included in the write data, the write data in a data storage area in the memory controller in association with a writing destination address of the write data,
  the first write data stored in the data storage area includes a data portion which contains error occurrence cause information as the error information, and an error correcting code (ECC), in which a code indicating that the error occurs is embedded as the error information, for the data portion.

* * * * *